(12) United States Patent
Izumi

(10) Patent No.: US 12,073,997 B2
(45) Date of Patent: Aug. 27, 2024

(54) MULTILAYER CERAMIC CAPACITOR

(71) Applicant: Murata Manufacturing Co., Ltd., Nagaokakyo (JP)

(72) Inventor: Tatsuya Izumi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 182 days.

(21) Appl. No.: 17/835,282

(22) Filed: Jun. 8, 2022

(65) Prior Publication Data
US 2022/0406525 A1 Dec. 22, 2022

(30) Foreign Application Priority Data

Jun. 16, 2021 (JP) .................................. 2021-100073

(51) Int. Cl.
*H01G 4/012* (2006.01)
*H01G 4/30* (2006.01)

(52) U.S. Cl.
CPC .............. *H01G 4/012* (2013.01); *H01G 4/30* (2013.01)

(58) Field of Classification Search
CPC .......... H01G 4/012; H01G 4/30; H01G 2/065; H01G 2/24; H01G 4/0085; H01G 4/12; H01G 4/20; H01G 4/2325; H01G 4/306; H01G 4/33
See application file for complete search history.

(56) References Cited

U.S. PATENT DOCUMENTS

| | | | |
|---|---|---|---|
| 2008/0169530 A1* | 7/2008 | Koebrugge | H01G 4/1227 257/532 |
| 2011/0228443 A1 | 9/2011 | Nishimura et al. | |
| 2012/0307414 A1* | 12/2012 | Kim | H01G 4/01 361/301.4 |
| 2013/0002388 A1* | 1/2013 | Kim | H01G 4/30 336/200 |

(Continued)

FOREIGN PATENT DOCUMENTS

| | | |
|---|---|---|
| JP | H06349666 A | 12/1994 |
| JP | H08181033 A | 7/1996 |

(Continued)

OTHER PUBLICATIONS

Office Action in CN202210547945.X, mailed Aug. 19, 2023, 8 pages.

(Continued)

*Primary Examiner* — Michael P McFadden
(74) *Attorney, Agent, or Firm* — Keating & Bennett, LLP

(57) ABSTRACT

A multilayer ceramic capacitor includes internal electrode layers and dielectric layers laminated alternately, and external electrodes on end surfaces. The internal electrode layers extend in a length direction and a width direction. The dielectric layers include about 100 moles or more and about 101 moles or less of Ca with respect to 100 moles of Zr. One side in the length direction of the internal electrode layers is connected to one of the external electrodes. Another side of the internal electrode layers is not connected to the external electrodes. A length at a middle portion in the width direction of the internal electrode layers is defined as L1, and a length at an end portion in the width direction is defined as L2, the internal electrode layers include a curved end side extending in the width direction so that L2<L1 is satisfied.

15 Claims, 13 Drawing Sheets

(56) References Cited

U.S. PATENT DOCUMENTS

| | | | |
|---|---|---|---|
| 2013/0286535 A1* | 10/2013 | Chung | H01G 4/12 |
| | | | 361/301.4 |
| 2014/0174806 A1* | 6/2014 | Park | H01G 2/06 |
| | | | 361/321.2 |
| 2015/0170842 A1 | 6/2015 | An et al. | |
| 2016/0247632 A1* | 8/2016 | Tsukida | H01G 4/0085 |
| 2016/0284471 A1* | 9/2016 | Mizuno | H01G 4/1227 |
| 2017/0148571 A1* | 5/2017 | Akada | H01G 4/232 |
| 2017/0221634 A1* | 8/2017 | Inomata | H01G 4/385 |
| 2019/0272954 A1 | 9/2019 | Ariga et al. | |
| 2021/0074476 A1 | 3/2021 | Kubota | |
| 2021/0134527 A1* | 5/2021 | Ogawa | C04B 35/486 |

FOREIGN PATENT DOCUMENTS

| | | | |
|---|---|---|---|
| JP | H1064703 A | 3/1998 | |
| JP | 2005101425 A | 4/2005 | |
| JP | 2005259772 A | 9/2005 | |
| JP | 2011195347 A | 10/2011 | |
| JP | 2016082033 A | 5/2016 | |
| JP | 2019-153778 A | 9/2019 | |
| JP | 2021044317 A | 3/2021 | |

OTHER PUBLICATIONS

Office Action in JP2021-100073, mailed Nov. 7, 2023, 3 pages.
Second Office Action in CN202210547945.X, mailed Feb. 23, 2024, 9 pages.

* cited by examiner

FIG .7

|  | Ca (MOLE) | Ti (MOLE) | NUMBER OF Cap DEVIATIONS FROM SPECIFIED VALUE | IR VALUE |
|---|---|---|---|---|
| EXAMPLE1 | 99 | 0 | 13/72 | △ |
| EXAMPLE2 | 100.1 | 1.3 | 0/72 | ○ |
| EXAMPLE3 | 100.2 | 1.5 | 0/72 | ◉ |
| EXAMPLE4 | 100.3 | 2.1 | 0/72 | ◉ |
| EXAMPLE5 | 100.7 | 2.3 | 0/72 | ◉ |
| EXAMPLE6 | 100.9 | 2.6 | 0/72 | ◉ |
| EXAMPLE7 | 100.8 | 3.1 | 0/72 | ◉ |
| EXAMPLE8 | 100.7 | 3.5 | 0/72 | ◉ |
| EXAMPLE9 | 100.9 | 3.8 | 0/72 | ◉ |
| EXAMPLE10 | 100.7 | 4 | 0/72 | ◉ |
| EXAMPLE11 | 100.9 | 4.2 | 0/72 | ○ |
| EXAMPLE12 | 101 | 4.4 | 0/72 | ○ |
| EXAMPLE13 | 101.2 | 0 | 24/72 | △ |

MULTILAYER CERAMIC CAPACITOR

CROSS REFERENCE TO RELATED APPLICATIONS

This application claims the benefit of priority to Japanese Patent Application No. 2021-100073 filed on Jun. 16, 2021. The entire contents of this application are hereby incorporated herein by reference.

BACKGROUND OF THE INVENTION

1. Field of the Invention

The present invention relates to a multilayer ceramic capacitor.

2. Description of the Related Art

Recently, multilayer ceramic capacitors with a small temperature change of capacitance are sought. In this regard, in order to reduce the resistive temperature coefficient, multilayer ceramic capacitors are known in which dielectric layers including Ca and Zr are used (see, for example, Japanese Unexamined Patent Application Publication No. 2019-153778).

However, when a relatively high voltage is applied to multilayer ceramic capacitors in which dielectric layers including Ca and Zr are used, dielectric breakdown may occur.

SUMMARY OF THE INVENTION

Preferred embodiments of the present invention provide multilayer ceramic capacitors in each of which dielectric breakdown is unlikely to occur.

A multilayer ceramic capacitor according to a preferred embodiment of the present invention includes a multilayer body including an inner layer portion including internal electrode layers and dielectric layers laminated alternately in a lamination direction, the internal electrode layers each extending in a length direction and a width direction, the dielectric layers each extending in the length direction and the width direction and including about 100 moles or more and about 101 moles or less of Ca with respect to 100 moles of Zr, and two external electrodes respectively on end surfaces of the multilayer body in the length direction, wherein one side in the length direction of each of the internal electrode layers is connected to one of the two external electrodes, another side in the length direction of each the internal electrode layers is not connected to either of the two external electrodes, and when a length at a middle portion in the width direction of each of the internal electrode layers is defined as L1, and a length at an end portion in the width direction of each of the internal electrode layers is defined as L2, each of the internal electrode layers includes a curved end side which is provided on the another side in the length direction and extends in the width direction so that a relationship of L2<L1 is satisfied.

According to preferred embodiments of the present invention, it is possible to provide multilayer ceramic capacitors in each of which dielectric breakdown is unlikely to occur.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a table showing the measurement results from measuring the moisture resistance and insulation resistance of Examples prepared by varying mole numbers of Ca and Ti contained in the dielectric layer 4 in the multilayer ceramic capacitor 1 according to the first preferred embodiment of the present invention.

FIG. 8 corresponds to FIG. 2 of the first preferred embodiment of the present invention.

FIG. 9 corresponds to FIG. 2 of the first preferred embodiment of the present invention.

FIG. 11 corresponds to FIG. 2 of the first preferred embodiment of the present invention.

FIG. 13 corresponds to FIG. 2 of the first preferred embodiment of the present invention.

DETAILED DESCRIPTION OF THE PREFERRED EMBODIMENTS

Preferred embodiments of the present invention will be described below with reference to the drawings.

First Preferred Embodiment

Figure 1:
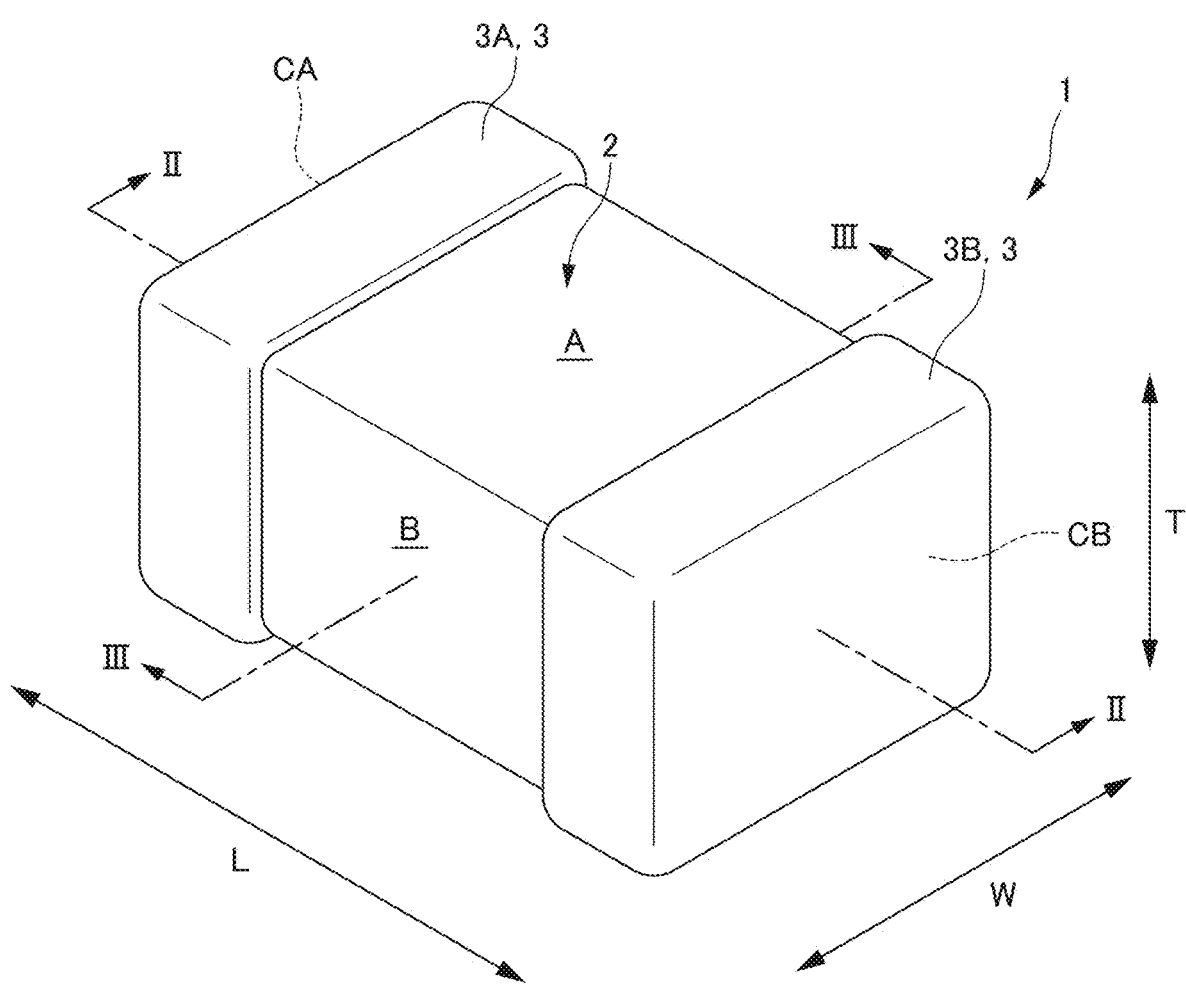
FIG. 1 is a schematic perspective view of a multilayer ceramic capacitor 1 according to a first preferred embodiment of the present invention.
Figure 2:
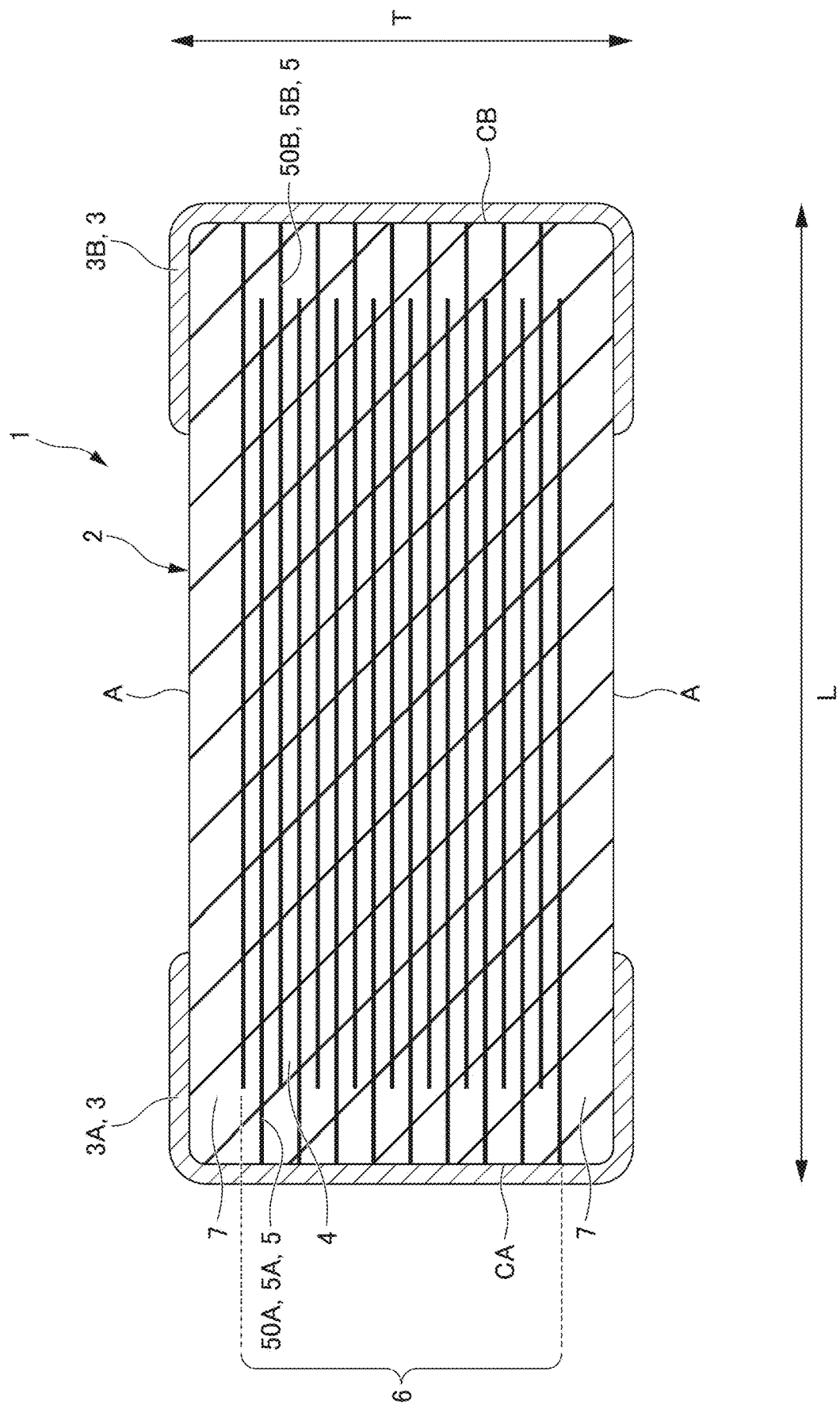
FIG. 2 is a cross-sectional view taken along the line II-II of the multilayer ceramic capacitor 1 according to the first preferred embodiment of the present invention shown in FIG. 1.
Figure 3:
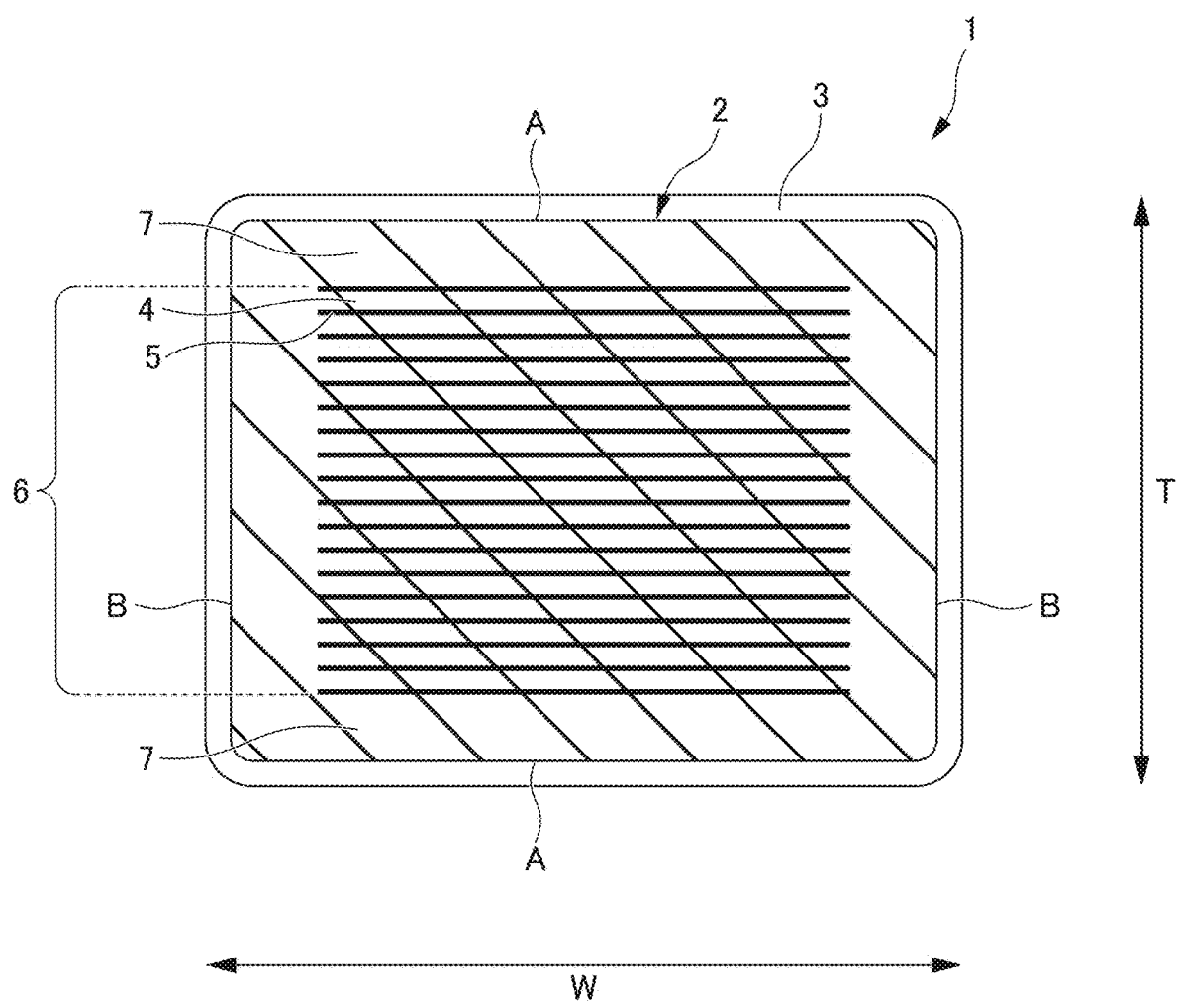
FIG. 3 is a cross-sectional view taken along the line III-III of the multilayer ceramic capacitor 1 according to the first preferred embodiment of the present invention shown in FIG. 1.

Hereinafter, a multilayer ceramic capacitor 1 according to a first preferred embodiment of the present invention will be described. FIG. 1 is a schematic perspective view of the multilayer ceramic capacitor 1 of the first preferred embodiment of the present invention. FIG. 2 is a cross-sectional view taken along the line II-II of the multilayer ceramic capacitor 1 of the first preferred embodiment shown in FIG. 1. FIG. 3 is a cross-sectional view taken along the line III-III of the multilayer ceramic capacitor 1 of the first preferred embodiment shown in FIG. 1.

Multilayer Ceramic Capacitor 1

The multilayer ceramic capacitor 1 is a rectangular or substantially rectangular parallelepiped shape. The multilayer ceramic capacitor 1 includes a multilayer body 2, and a pair of external electrodes 3. The pair of external electrodes 3 are provided at both ends of the multilayer body 2. The multilayer body 2 includes an inner layer portion 6. The inner layer portion 6 includes a plurality of dielectric layers 4 and a plurality of internal electrode layers 5 stacked therein.

In the following description, as terms representing the directions of the multilayer ceramic capacitor 1, the following definitions are used. In the multilayer ceramic capacitor 1, the direction in which the pair of external electrodes 3 are provided is defined as the length direction L. The direction in which the dielectric layer 4 and the internal electrode layer 5 are laminated is defined as the stacking (lamination) direction T. The direction intersecting both the length direction L and the lamination direction T is defined as the width direction W. In the preferred embodiments, the width direction W is orthogonal or substantially orthogonal to both the length direction L and the lamination direction T. The multilayer ceramic capacitor 1 may have, for example, a dimension in the length direction L of about 0.2 mm or more and about 2.0 mm or less, a dimension in the lamination direction T of about 0.1 mm or more and about 1.2 mm or less, and a dimension in the width direction W of about 0.1 mm or more and about 1.2 mm or less.

Furthermore, in the following description, among the six outer peripheral surfaces of the multilayer body 2, a pair of outer peripheral surfaces opposing in the lamination direction T is defined as the main surface A, a pair of outer peripheral surfaces opposing in the width direction W is defined as the side surface B, and a pair of outer peripheral surfaces opposing in the length direction L is defined as a first end surface CA and a second end surface CB. If it is not necessary to particularly distinguish between the first end surface CA and the second end surface CB, they may be collectively described as the end surface C.

Multilayer Body 2

The multilayer body 2 includes the inner layer portion and outer layer portions 7. The outer layer portions 7 are provided on both main surfaces A of the inner layer portion 6.

Inner Layer Portion 6

The plurality of dielectric layers 4 and the plurality of internal electrode layers 5 are laminated in the inner layer portion 6. The inner layer portion 6 includes, for example, 30 layers or more and 50 layers or less of the internal electrode layers 5 and the dielectric layers 4, respectively.

Dielectric Layer 4

The dielectric layer 4 may be made of a ceramic material such as $CaZrO_3$ (calcium zirconate) including about 100 moles to about 101 moles of Ca (calcium) per 100 moles of Zr (zirconium), for example. The ceramic material including Zr and Ca has a small change in the temperature of the capacitance. Therefore, the ceramic material including Zr and Ca has a characteristic in that the temperature coefficient Tc [ppm/° C.] is small. In addition, the dielectric layers 4 each preferably include Ti (titanium) in an amount of about 1.3 moles or more and about 4.4 moles or less, and more preferably Ti in an amount of about 1.5 moles or more and about 4.0 moles or less, with respect to 100 moles of Zr, for example.

For example, the dielectric layers 4 may each include a ceramic material in which a portion of Zr in $CaZrO_3$ is replaced with Ti. This ceramic material preferably includes Ti (titanium) in an amount of about 1.3 moles or more and about 4.4 moles or less, and more preferably contains Ti in an amount of about 1.5 moles or more and about 4.0 moles or less, with respect to 100 moles of Zr, for example.

Internal Electrode Layer 5

The internal electrode layers 5 each include a plurality of first internal electrode layers 5A and a plurality of second internal electrode layers 5B. The plurality of first internal electrode layers 5A and the plurality of second internal electrode layers 5B each have a thickness of, for example, about 1.0 μm or more and about 4.0 μm or less. The first internal electrode layers 5A and the second internal electrode layers 5B are alternately provided. When it is not necessary to particularly distinguish between the first internal electrode layer 5A and the second internal electrode layer 5B, they may be collectively described as the internal electrode layer 5. Details of the internal electrode layer 5 will be described later.

As the metal material used for the internal electrode layer 5, Cu or Cu alloy may be used, for example. When Cu or Cu alloy is used in the internal electrode layer 5, the specific resistance of the internal electrode layer 5 is reduced. As a result, ESR (equivalent series resistance) of the multilayer ceramic capacitor 1 is reduced.

Outer Layer Portion 7

The outer layer portions 7 are respectively provided in the vicinity of both of the main surfaces A of the inner layer portion 6. The outer layer portions 7 are each manufactured of the same dielectric ceramic material as the dielectric layer 4 of the inner layer portion 6.

External Electrode 3

The external electrodes 3 include a first external electrode 3A, and a second external electrode 3B. The first external electrode 3A is provided on the first end surface CA of the multilayer body 2. The second external electrode 3B is provided on the second end surface CB of the multilayer body 2. When it is not necessary to particularly distinguish between the first external electrode 3A and the second external electrode 3B, they may be collectively described as the external electrode 3. The external electrode 3 covers not only the end surface C, but also portions of the main surface A and the side surface B which are in the vicinity of the end surface C.

Details of Internal Electrode Layer 5

Figure 4:
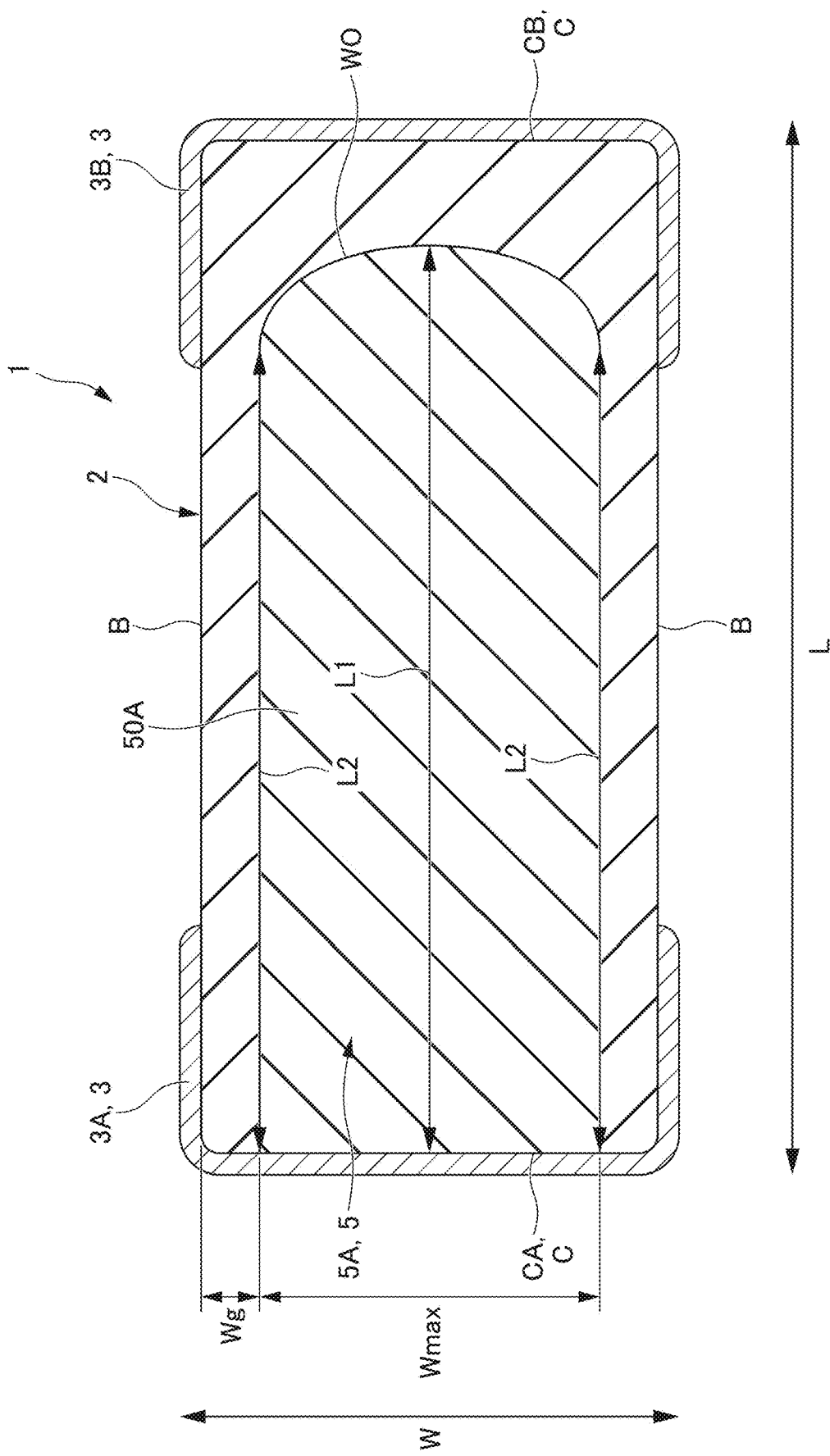
FIG. 4 is an LW cross-sectional view passing through a first internal electrode layer 5A of the multilayer ceramic capacitor 1 according to the first preferred embodiment of the present invention.
Figure 5:
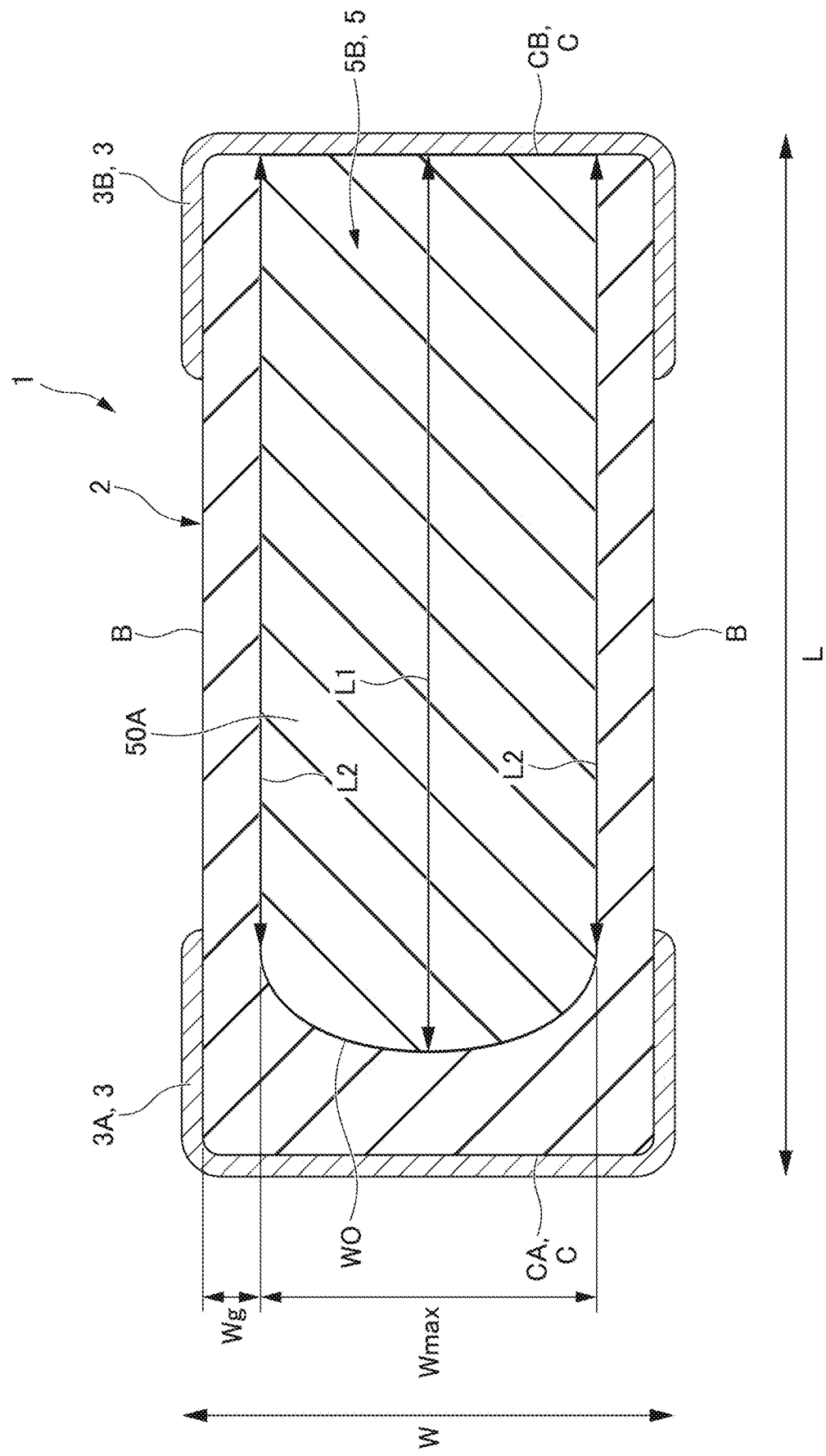
FIG. 5 is an LW cross-sectional view passing through a second internal electrode layer 5B of the multilayer ceramic capacitor 1 according to the first preferred embodiment of the present invention.

In the internal electrode layers 5, the first internal electrode layers 5A and the second internal electrode layers 5B are alternately provided with the dielectric layers 4 interposed therebetween. The first internal electrode layer 5A includes a first internal electrode 50A. The second internal electrode layer 5B includes second internal electrodes 50B. The first internal electrode 50A and the second internal electrodes 50B may be opposite to each other in the length direction L. The first internal electrode 50A and the second internal electrodes 50B may have the same or substantially the same shape and may have the same or substantially the same size. FIG. 4 is a diagram of an LW cross-section of the multilayer ceramic capacitor 1 of the first preferred embodiment. The LW cross-section refers to a cross-section obtained by cutting the multilayer ceramic capacitor 1 in a plane extending in the length direction L and the width direction W passing through the first internal electrode layer 5A. FIG. 5 is a diagram of an LW cross-section of the multilayer ceramic capacitor 1 of the first preferred embodiment. The LW cross-section refers to a cross section obtained by cutting the multilayer ceramic capacitor 1 in a plane extending in the length direction L and the width direction W passing through the second internal electrode layer 5B.

In the first internal electrode 50A included in the first internal electrode layer 5A, one side in the length direction L is exposed at the first end surface CA of the multilayer body 2 and connected to the first external electrode 3A, and the other side in the length direction L is not exposed at the second end surface CB of the multilayer body 2, or not connected to the second external electrode 3B.

In the second internal electrode 50B included in the second internal electrode layer 5B, one side in the length direction L is exposed at the second end surface CB of the multilayer body 2 and connected to the second external electrode 3B, and the other side in the length direction L is not exposed at the first end surface CA of the multilayer body 2 or not connected to the first external electrode 3A.

An end side W0 which is not connected to the second external electrode 3B of the first internal electrode 50A, and an end side W0 which is not connected to the first external electrode 3A of the second internal electrode 50B may each include a curved shape. Furthermore, in the first internal electrode 50A and the second internal electrode 50B, when the length at the middle portion in the width direction W is defined as L1, and the length at the end in the width direction W is defined as L2, the relationship of L2<L1 may be satisfied, for example.

In the first internal electrode 50A and the second internal electrode 50B, the end side W0 may be linearly symmetrical or substantially linearly symmetrical with respect to a straight line of the length L1 passing through the middle portion in the width direction W, and both lateral sides along the ends in the width direction W are defined as the length L2.

Furthermore, as shown in FIG. 4, the curved shape may include a shape without a linear portion on the end side W0. Furthermore, the curved shape may include a shape having a linear portion in a predetermined range passing through the middle in the width direction of the end side W0, and rounded corners provided between the linear portion and the both lateral sides, for example. Furthermore, when the maximum width of the first internal electrode 50A and the second internal electrode 50B is defined as Wmax, the radius of curvature at the middle portion in the width direction of the end side W0 may be, for example, about 70% or more of Wmax.

The first internal electrodes 50A and the second internal electrodes 50B are alternately provided so that most of them overlap each other. The overlapped portions correspond to opposing portions in which charges are accumulated. The portion of the first internal electrode 50A that does not overlap with the second internal electrode 50B corresponds to an extension portion extending toward the first external electrode 3A. The portion of the second internal electrode 50B that does not overlap with the first internal electrode 50A corresponds to an extension portion extending toward the second external electrode 3B.

The first internal electrode 50A and the second internal electrode 50B are not exposed at the side surface B in the width direction W of the multilayer body 2. The distances Wg between the side surfaces B on both sides in the width direction W of the multilayer body 2, and the ends in the width direction W of the first internal electrode 50A and the second internal electrode 50B may be about 2.0 µm or more and about 60 µm or less, for example. These portions each may be referred to as a side gap portion.

When the maximum width of the first internal electrode 50A and the maximum width of the second internal electrode 50B are defined as Wmax, the relationship of Wmax<L2 may be satisfied, for example. In the preferred embodiments, the first internal electrode 50A and the second internal electrode 50B each may have, for example, a constant or substantially constant width in the portions other than the curved end side W0. Therefore, the width of the first internal electrode 50A and the second internal electrode 50B may be the largest width Wmax.

Furthermore, in the first internal electrode 50A and the second internal electrode 50B, the relationships of about 0.2Wmax<L2−L1<about 0.4Wmax and Wmax<about 0.6L2 may be satisfied, for example.

Method of Manufacturing Multilayer Ceramic Capacitor 1

Figure 6:
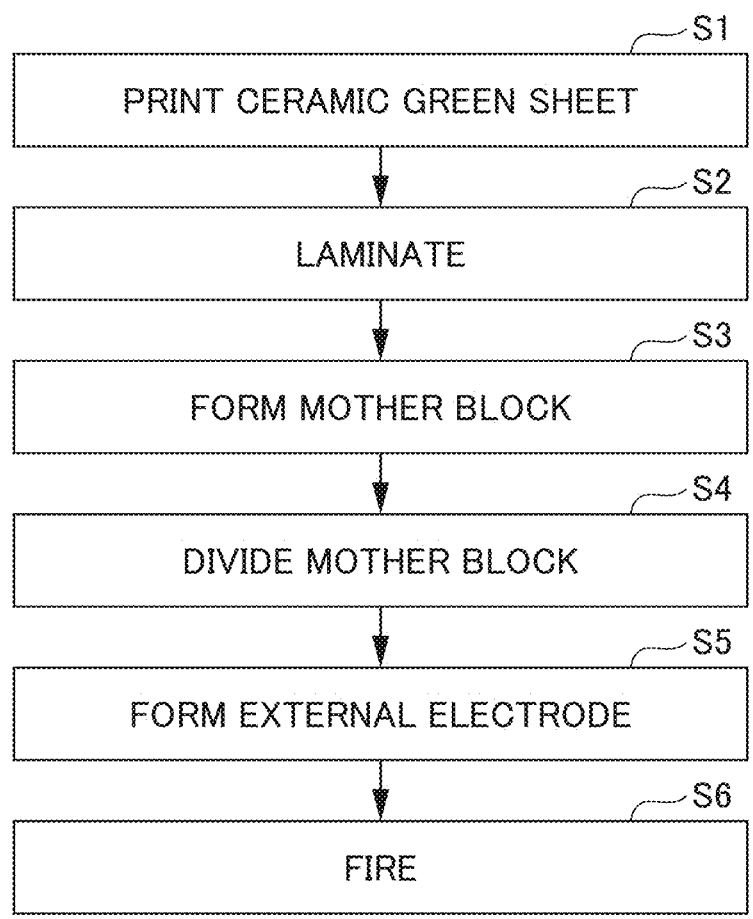
FIG. 6 is a flowchart of a method of manufacturing the multilayer ceramic capacitor 1 according to the first preferred embodiment of the present invention.

FIG. 6 is a flowchart of a non-limiting example of a method of manufacturing the multilayer ceramic capacitor 1 according to the first preferred embodiment.

Ceramic Green Sheet Printing Step S1

As illustrated, in Step S1, a ceramic slurry including a ceramic powder, a binder, and a solvent is formed into a sheet on a carrier film. Internal electrode patterns of the first internal electrode 50A and the second internal electrode 50B are printed on the resulting strip-shaped ceramic green sheet.

Laminating Step S2

A plurality of material sheets are stacked so that the internal electrode patterns are shifted by a half pitch in the length direction L between the material sheets adjacent to each other in the lamination direction T. Furthermore, outer layer portion ceramic green sheets defining and functioning as the outer layer portions 7 are stacked on both sides in the lamination direction T of the plurality of stacked material sheets.

Mother Block Forming Step S3

Subsequently, the outer layer portion ceramic green sheets defining and functioning as the outer layer portions 7 are stacked respectively on both sides in the lamination direction T of the plurality of stacked material sheets. The resulting product is subjected to thermocompression to form a mother block.

Mother Block Dividing Step S4

The mother block is then divided so that a plurality of multilayer bodies 2 are manufactured.

External Electrode Forming Step S5

The external electrodes 3 are formed at both ends of the multilayer body 2.

Firing Step S7

Then, the external electrodes 3 are heated for a predetermined time in a nitrogen atmosphere at the set firing temperature. As a result, the external electrodes 3 are fired onto the multilayer body 2, such that the multilayer ceramic capacitor 1 shown in FIG. 1 is manufactured.

Before the advantageous effects of the first preferred embodiment are described, a multilayer ceramic capacitor as a comparative example will be described. In the multilayer ceramic capacitor as a comparative example, the lengths L2 of the lateral sides of both ends in the width direction W of the internal electrode layer 5 are equal or substantially equal to the length L1 at the middle portion in the width direction W of the internal electrode layer 5, the end side which is not connected to the external electrode 3 in the length direction L of the internal electrode layer 5 is linear, and the internal electrode layer 5 has a rectangular or substantially rectangular shape.

In the case of the multilayer ceramic capacitor of such a comparative example, in the internal electrode layer 5, the corner portions between the end side and the lateral sides are 90 degrees or about 90 degrees. In this case, when the voltage applied to the external electrode 3 increases, an electric field may be concentrated on the corner on the side which is not exposed at the second end surface CB of the multilayer body 2 or not connected to the second external electrode 3B in the first internal electrode 50A, or on the corner on the side which is not exposed at the first end surface CA of the multilayer body 2 or not connected to the first external electrode 3A in the second internal electrode 50B, such that there is a possibility that dielectric breakdown occurs between the internal electrode layer 5 and the external electrode 3 which is not originally connected thereto.

However, according to the multilayer ceramic capacitor 1 of the present preferred embodiment, the end side W0 of the first internal electrode 50A which is not connected to the second external electrode 3B, and the end side W0 of the second internal electrode 50B which is not connected to the first external electrode 3A each have a curved shape.

Therefore, in the internal electrode layer 5, there is no corner between the lateral sides and the end side, and thus is smooth. Alternatively, even when a corner exists, the angle becomes more obtuse than 90 degrees. Therefore, even when the voltage applied to the external electrode 3 increases, the possibility that dielectric breakdown occurs between the external electrode 3 and the internal electrode layer 5 is reduced between the lateral sides and the end side W0, as compared with the comparative example.

Furthermore, the end side W0 does not include a curved and pointed portion even in portions other than the corners. Therefore, it is unlikely that dielectric breakdown occurs between the external electrode 3 and the internal electrode layer 5.

As described above, the dielectric layers 4 each preferably include, for example, Ti in an amount of about 1.3 moles or more and about 4.4 moles or less, and more preferably Ti in an amount of about 1.5 moles or more and about 4.0 moles or less, with respect to 100 moles of Zr.

FIG. 7 is a table showing the measurement results from measuring the moisture resistance and insulation resistance of Examples 1 to 13 prepared by varying the mole number of Ca and Ti with respect to 100 moles of Zr included in the dielectric layer 4 in the multilayer ceramic capacitor 1 of the first preferred embodiment. In all of Examples 1 to 13, the multilayer ceramic capacitor 1 of the first preferred embodiment is used in which the end side W0 of the first internal electrode 50A which is not connected to the second external electrode 3B, and the end side W0 of the second internal electrode 50B which is not connected to the first external electrode 3A each have a curved shape.

For each of Examples 1 to 13, 72 pieces of the multilayer ceramic capacitors 1 were prepared in which the mole numbers of Ca and Ti with respect to 100 moles of Zr included in the dielectric layer 4 differ from each other. DC voltage of about 200 V was applied to each of the multilayer ceramic capacitors 1 in a humid environment of about 150° C. for about 2000 hours.

Thereafter, in each Example, the number of capacitance (Cap) deviations from a specified value among 72 pieces of the multilayer ceramic capacitors 1 was counted. If the number of capacitance deviations from a specified value among 72 pieces of the multilayer ceramic capacitors 1 is 25 or less, the moisture resistance of the multilayer ceramic capacitor 1 of the Example falls within an allowable range. If the number of capacitance deviations from a specified value among 72 pieces of the multilayer ceramic capacitors 1 is 0, the moisture resistance is good.

Furthermore, the insulation resistance (IR) was also measured. The multilayer ceramic capacitor 1 exhibiting IR<about $10^8$ was determined as fail "X" (cross symbol) because the dielectric breakdown is likely to occur. The multilayer ceramic capacitor 1 exhibiting about $10^8 \leq$ IR<about $10^9$ was determined as allowable "Δ" (triangle symbol) indicating that the insulation resistance is allowable. The multilayer ceramic capacitor 1 indicating about $10^9 \leq$ IR<about $10^{10}$ was determined as good insulation resistance "○" (circle symbol). The multilayer ceramic capacitor 1 indicating about $10^{10} \leq$ IR was determined as excellent insulation resistance "◎" (bullseye symbol).

As shown in the Table, in all of Examples 1 to 13, the number of capacitance deviations from the specified value among 72 pieces of the multilayer ceramic capacitor 1 was 25 or less. Therefore, it is confirmed that, regardless of the amount of Ti of the dielectric layer 4, the moisture resistance of the multilayer ceramic capacitor 1 of the preferred embodiment was allowable.

Furthermore, in Examples 2 to 12 in which the dielectric layers 4 included about 1.3 moles or more and about 4.4 moles or less of Ti with respect to 100 moles of Zr, the number of capacitance deviations from the specified value among 72 pieces of the multilayer ceramic capacitor 1 was 0. Therefore, it was confirmed that the multilayer ceramic capacitors 1 in which the dielectric layers 4 included about 1.3 moles or more and about 4.4 moles or less of Ti with respect to 100 moles of Zr were more preferable in terms of moisture resistance.

In addition, as shown in the Table, as for insulation resistance, none of Examples 1 to 13 corresponded to IR<about $10^8$. Therefore, it was confirmed that, regardless of the content of Ti in the dielectric layer 4, the insulation resistances of each of the multilayer ceramic capacitors 1 fell within the allowable range.

In Examples 2 to 12, the multilayer ceramic capacitors 1 each included about 1.3 moles or more and about 4.4 moles or less of Ti in the dielectric layer 4. Therefore, Examples 2 to 12 fall within the range of about $10^8 \leq$ IR≤about $10^9$. As a result, it was confirmed that it was preferable that the multilayer ceramic capacitors 1 each included about 1.3 moles or more and about 4.4 moles or less of Ti in the dielectric layer 4.

Furthermore, in Examples 3 to 10, the multilayer ceramic capacitors 1 each included about 1.5 moles or more and about 4.0 moles or less of Ti in the dielectric layer 4. Therefore, Examples 3 to 10 fall within the range of about $10^{10} \leq$ IR. It was confirmed that it was preferable that the multilayer ceramic capacitors 1 each more preferably included about 1.5 moles or more and about 4.0 moles or less of Ti in the dielectric layer 4.

From the above, it was confirmed that the multilayer ceramic capacitors 1 each preferably included about 1.3 moles or more and about 4.4 moles or less of Ti in the dielectric layer 4, and more preferably about 1.5 moles or more and about 4.0 moles or less of Ti in the dielectric layer 4.

Second Preferred Embodiment

Figure 8:
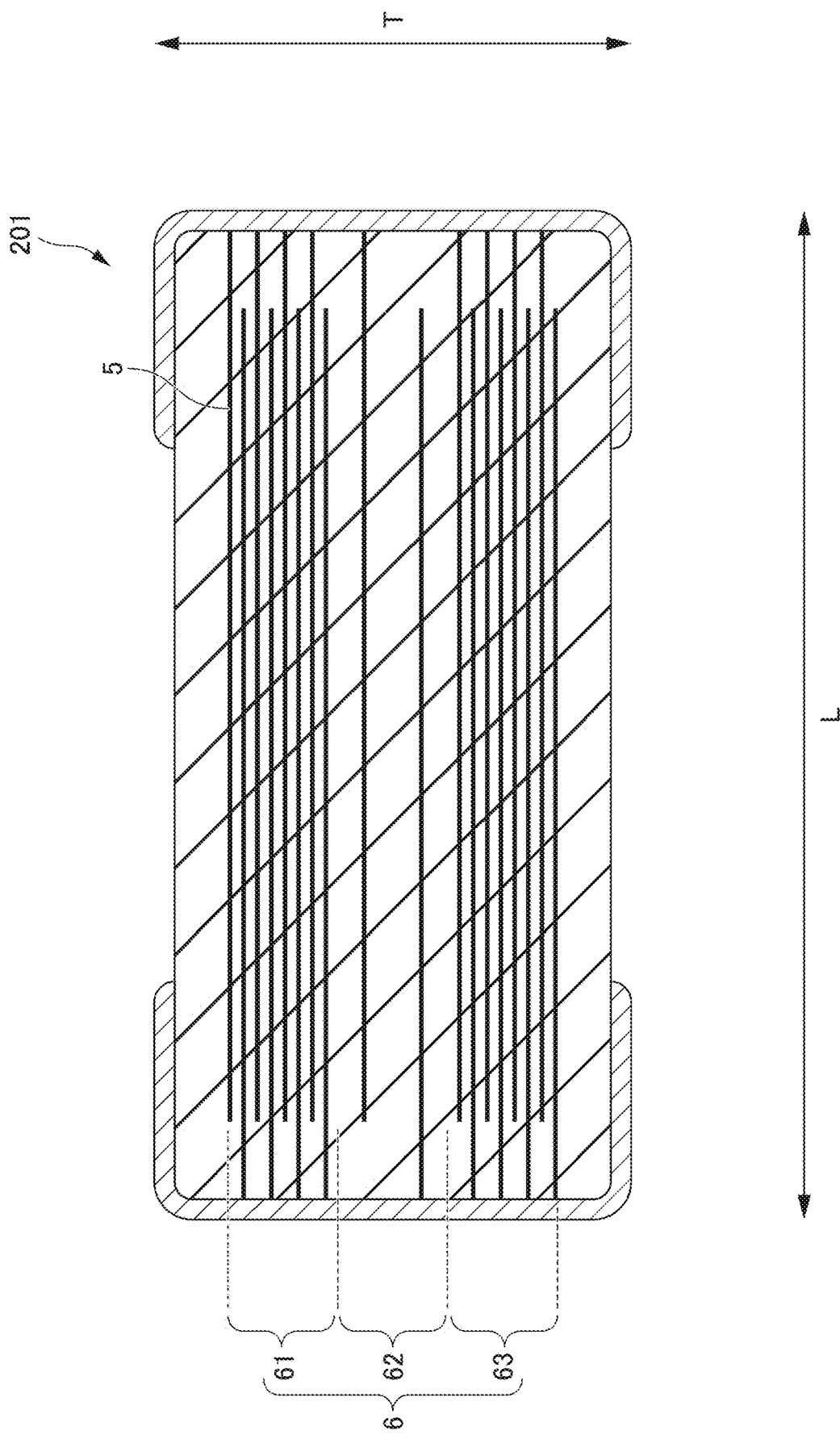
FIG. 8 is a cross-sectional view of a multilayer ceramic capacitor 201 according to a second preferred embodiment of the present invention.

FIG. 8 is a cross-sectional view of a multilayer ceramic capacitor 201 according to a second preferred embodiment of the present invention. FIG. 8 corresponds to FIG. 2 of the first preferred embodiment. In the multilayer ceramic capacitor 201 of the second embodiment of the present invention, when the inner layer portion 6 is equally or substantially equally divided into three portions including an upper inner layer portion 61, a middle inner layer portion 62, and a lower outer layer portion 63 in the lamination direction T, the number of the internal electrode layers 5 included in the middle inner layer portion 62 may differ from the number of the internal electrode layers 5 included in each of the upper inner layer portion 61 and the lower outer layer portion 63 located on both sides of the middle inner layer portion 62. In the second preferred embodiment of the present invention, for example, the number of internal electrode layers 5 included in the middle inner layer portion 62 may be smaller than the number of internal electrode layers 5 included in the upper inner layer portion 61 and the lower outer layer portion 63, for example.

The multilayer ceramic capacitor 201 of the second preferred embodiment is the same or substantially the same as the multilayer ceramic capacitor 1 of the first preferred embodiment, except for the distribution of the internal electrode layers 5 not being equal. That is, even in the multilayer ceramic capacitor 201 of the second preferred embodiment of the present invention, the internal electrodes 50 included in the internal electrode layers 5 may each have the length L2 on both ends in the width direction W shorter than the length L1 at the middle portion in the width direction W of the internal electrode layer 5, and the end side W0 of the internal electrode 50 in the length direction L which is not connected to the external electrode 3 may have a curved shape, for example.

Therefore, similarly to the first preferred embodiment of the present invention, in the internal electrode 50, there is no corner between the lateral sides and the end side, and thus is smooth. Alternatively, even when a corner exists, the angle becomes more obtuse than 90 degrees. Therefore, even when the voltage applied to the external electrode 3 increases, the possibility that dielectric breakdown occurs between the external electrode 3 and the internal electrode 50 is reduced between the lateral sides and the end side W0.

Furthermore, in the multilayer ceramic capacitor 201 of the second preferred embodiment of the present invention, the number of the internal electrode layers 5 included in the middle inner layer portion 62 differs from the number of the internal electrode layers included in the upper inner layer portion 61 and the lower outer layer portion 63 on both sides of the middle inner layer portion 62, such that it is possible to easily reduce equivalent series resistance (ESR), adjust the capacitance, etc.

Third Preferred Embodiment

Figure 9:
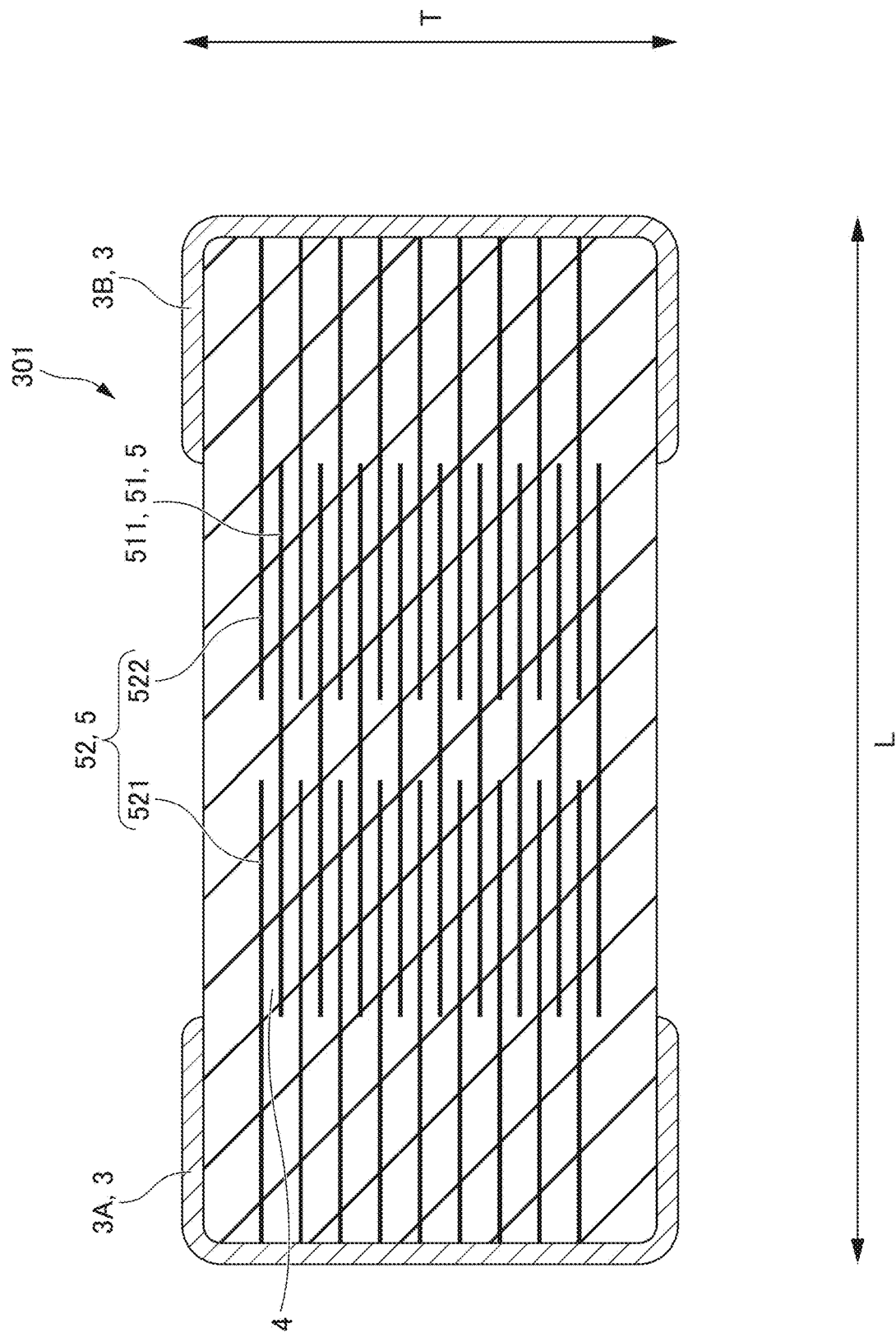
FIG. 9 is a cross-sectional view of a multilayer ceramic capacitor 301 according to a third preferred embodiment of the present invention.

FIG. 9 is a cross-sectional view of a multilayer ceramic capacitor 301 according to a third preferred embodiment of the present invention. FIG. 9 corresponds to FIG. 2 of the first preferred embodiment. In the multilayer ceramic capacitor 301 of the third preferred embodiment of the present invention, internal electrode one-piece layers 51 and internal electrode two-piece layers 52 may be arranged alternately. The internal electrode one-piece layer 51 may each include, for example, one internal electrode 511 in one internal electrode layer 5. The internal electrode two-piece layers 52 may each include, for example, two internal electrodes, i.e., an internal electrode 521 and an internal electrode 522, which are provided in one internal electrode layer 5 with a predetermined interval provided therebetween.

Figure 10A:
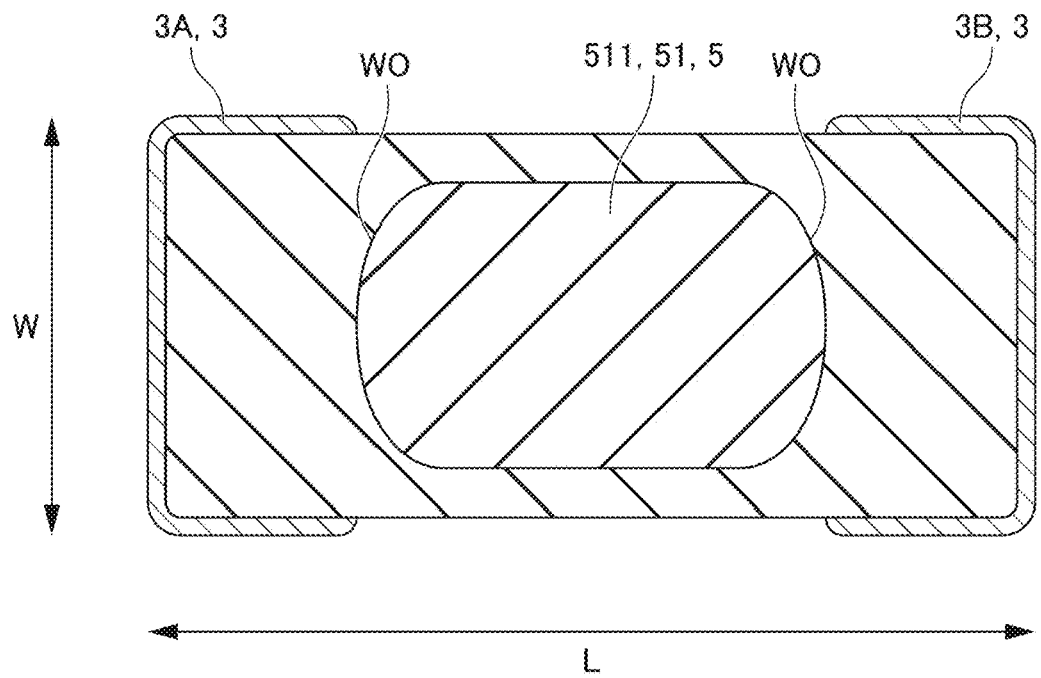
FIGS. 10A and 10B provide an LW cross-sectional view of the multilayer ceramic capacitor 301, with FIG. 10A being a cross-sectional view passing through an internal electrode one-piece layer 51, and FIG. 10B being a cross-sectional view passing through an internal electrode two-piece layer 52.
Figure 10B:
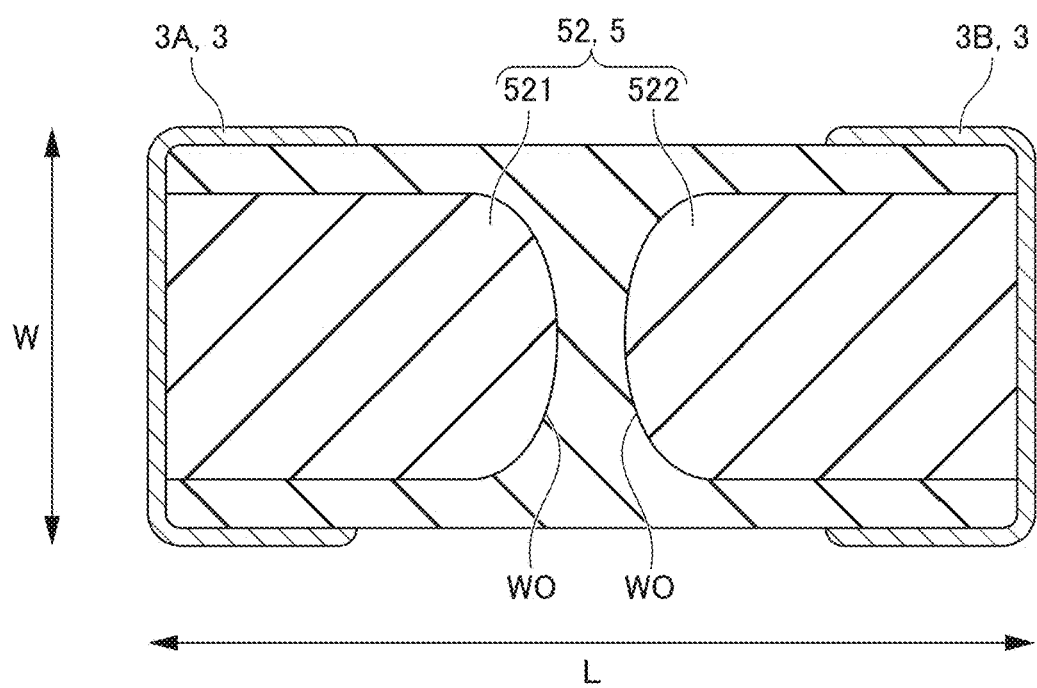

FIGS. 10A and 10B are diagrams of an LW cross-section of the multilayer ceramic capacitor 301. The LW cross-section refers to a cross-section obtained by cutting the multilayer ceramic capacitor 301 in a plane extending in the length direction L and the width direction W passing through the internal electrode layer 5. More specifically, FIG. 10A is a cross-sectional view passing through the internal electrode one-piece layer 51. FIG. 10B is a cross-sectional view passing through the internal electrode two-piece layer 52.

In the multilayer ceramic capacitor 1 of the first preferred embodiment of the present invention, one internal electrode layer 5 includes one internal electrode 50. Furthermore, the internal electrodes 50 included in the adjacent internal electrode layers 5 are opposite to each other in the length direction L. In contrast, in the multilayer ceramic capacitor 301 of the third preferred embodiment of the present invention, the internal electrode one-piece layer 51 and the internal electrode two-piece layer 52 may be provided alternately with the dielectric layer 4 interposed between.

The internal electrode one-piece layer 51 may include a single internal electrode 511. The internal electrode 511 may have a curved shape at both of one end side and the other end side in the length direction L in which none of the end sides of the internal electrode 511 are exposed at the end surface C, and are not connected to the external electrode 3. That is, the internal electrode 511 may be referred to as a floating electrode.

The internal electrode two-piece layer 52 may include two internal electrodes including an internal electrode 521 and an internal electrode 522. In the internal electrode 521, one side in the length direction L may be exposed at the first end surface CA of the multilayer body 2 and connected to the first external electrode 3A. In the internal electrode 521, the other end side W0 in the length direction L may have a curved shape. In the internal electrode 522, one side in the length direction L may be exposed at the second end surface CB of the multilayer body 2 and connected to the second external electrode 3B. In the internal electrode 522, the other end side W0 in the length direction L may have a curved shape. The end side W0 of the internal electrode 521 and the end side W0 of the internal electrode 522 may be opposed to each other with an interval provided therebetween.

Also in the third preferred embodiment of the present invention, the end side W0 of the internal electrode which is not connected to the external electrode 3 may have a curved shape. Therefore, even when the voltage applied to the external electrode 3 increases, the possibility that dielectric breakdown occurs between the external electrode 3 and the internal electrode 50 between the lateral sides and the end side W0 is reduced.

Furthermore, the opposing end sides W0 may each have a curved shape between the internal electrode 521 and the internal electrode 522. Therefore, even when the voltage accumulated in the internal electrode 50 increases, the possibility that dielectric breakdown occurs is reduced between the end sides W0.

Furthermore, in the case of the structure of the third preferred embodiment of the present invention, since the plurality of capacitors are connected in series, the withstand voltage performance is improved.

Fourth Preferred Embodiment

Figure 11:
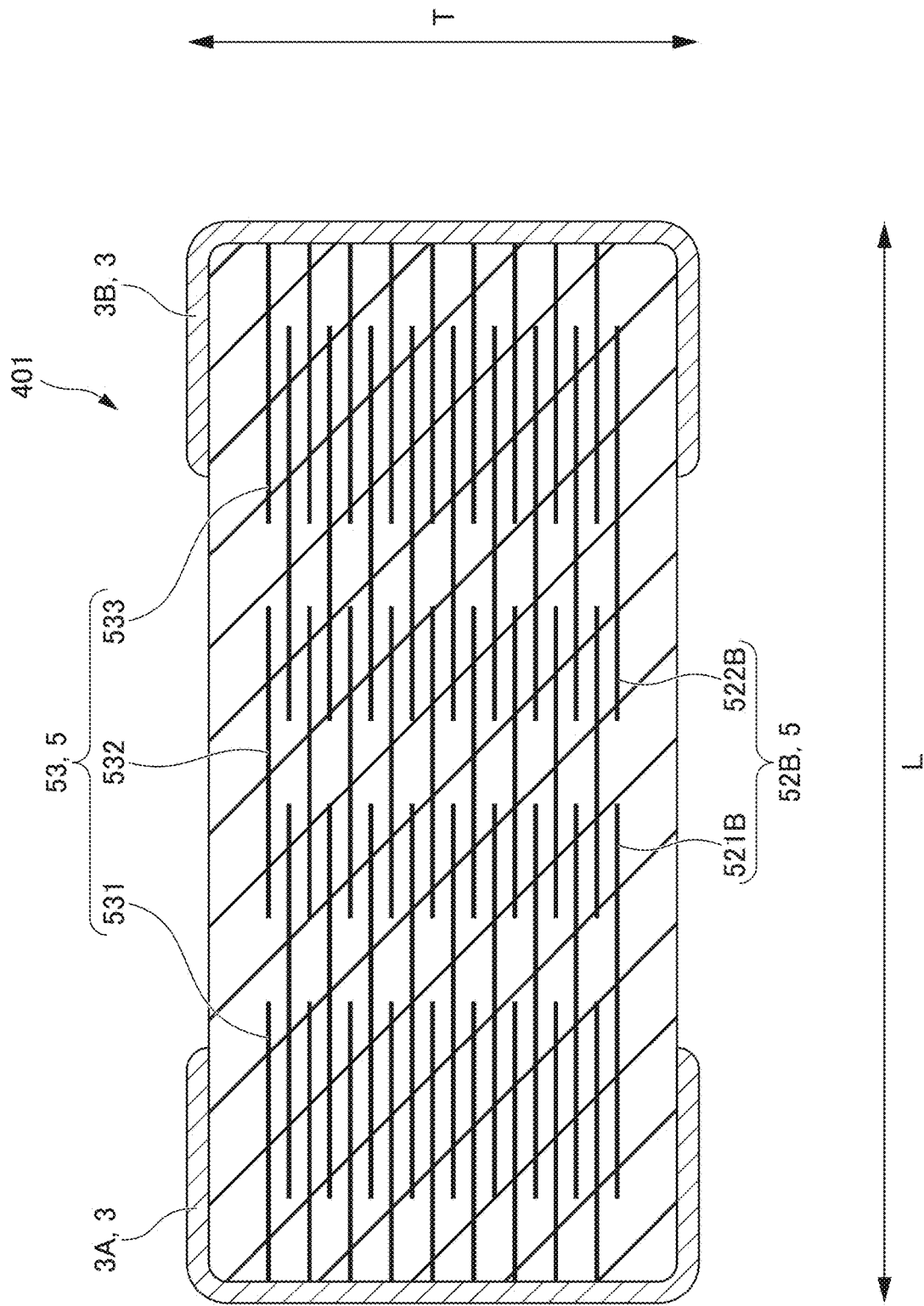
FIG. 11 is a cross-sectional view of a multilayer ceramic capacitor 401 according to a fourth preferred embodiment of the present invention.

FIG. 11 is a cross-sectional view of a multilayer ceramic capacitor 401 according to a fourth preferred embodiment of the present invention. FIG. 11 corresponds to FIG. 2 of the first preferred embodiment. In the multilayer ceramic capacitor 401 of the fourth preferred embodiment of the present invention, an internal electrode two-piece layer 52B and an internal electrode three-piece layer 53 may be provided alternately. The internal electrode two-piece layer 52B may include, for example, two internal electrodes, i.e., an internal electrode 521B and an internal electrode 522B, which are spaced apart from each other by a predetermined distance in one internal electrode layer 5. The internal electrode three-piece layer 53 may include, for example, three internal electrodes, i.e., an internal electrode 531, an internal electrode 532, and an internal electrode 533, which are spaced apart from each other by a predetermined distance, in one internal electrode layer 5.

Figure 12A:
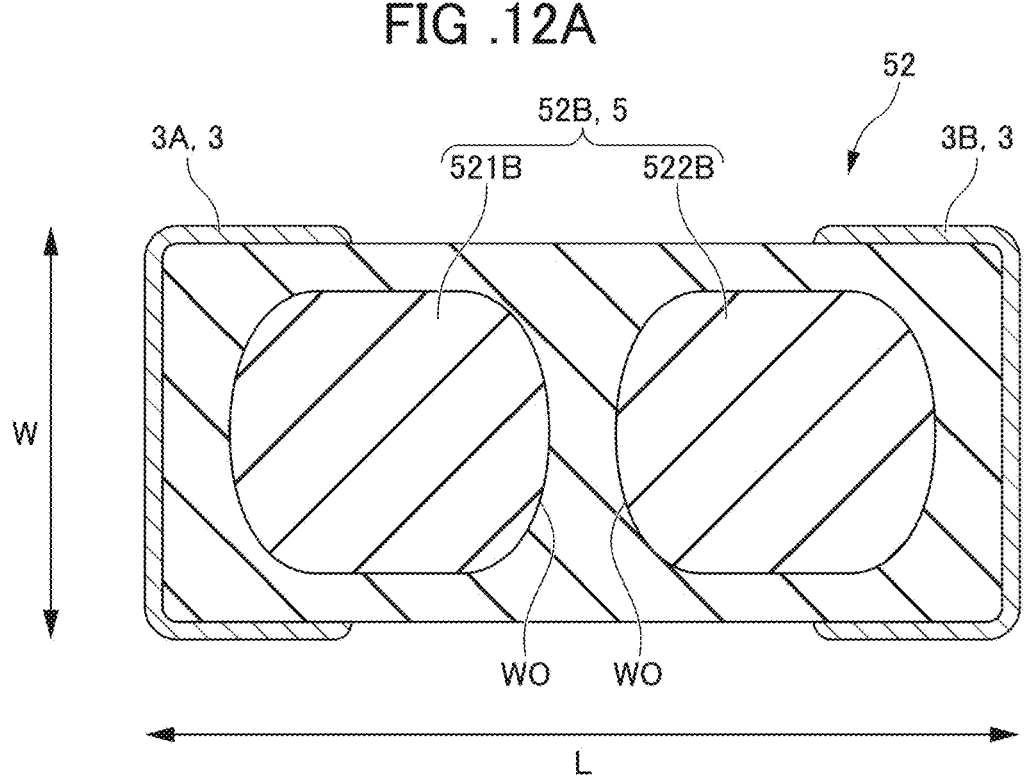
FIGS. 12A and 12B provide LW cross-sectional views of the multilayer ceramic capacitor 401, with FIG. 12A being a cross-sectional view passing through the internal electrode two-piece layer 52B, and FIG. 12B being a cross-sectional view passing through an internal electrode three-piece layer 53.
Figure 12B:
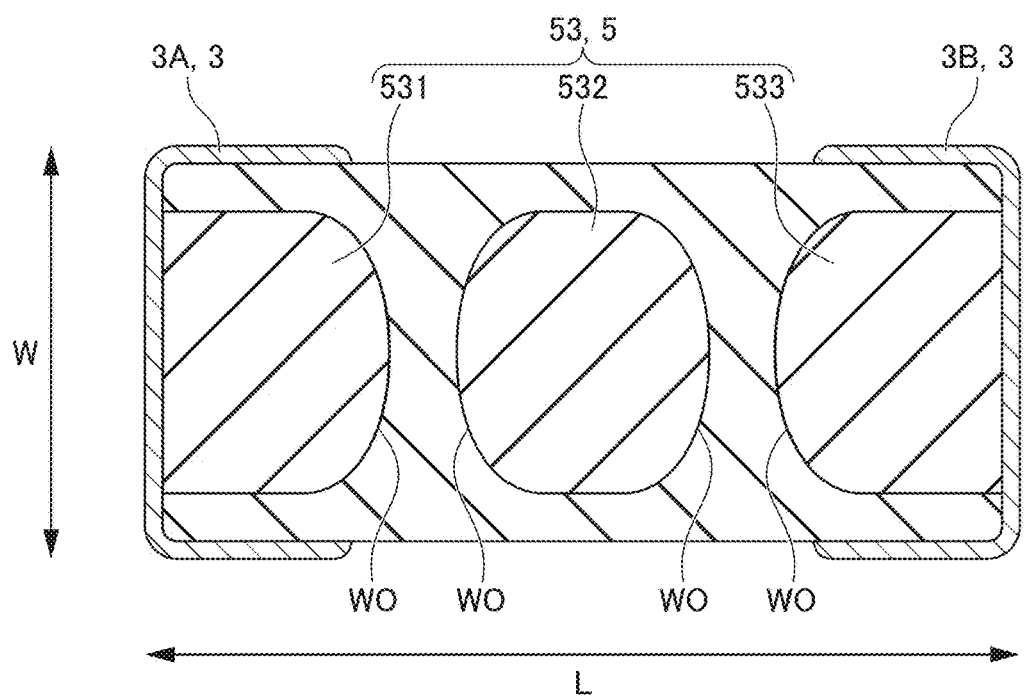

FIGS. 12A and 12B are diagrams of an LW cross-section of the multilayer ceramic capacitor 401. The LW cross-section refers to a cross-section obtained by cutting the multilayer ceramic capacitor 401 in a plane extending in the length direction L and the width direction W passing through the internal electrode layer 5. More specifically, FIG. 12A is a cross-sectional view passing through the internal electrode two-piece layer 52B. FIG. 12B is a cross-sectional view passing through the internal electrode three-piece layer 53.

In the multilayer ceramic capacitor 1 of the first preferred embodiment of the present invention, one internal electrode layer 5 includes one internal electrode 50. Furthermore, the internal electrodes 50 included in the adjacent internal electrode layers 5 are opposite to each other in the length direction L. In contrast, in the multilayer ceramic capacitor 401 of the fourth preferred embodiment of the present invention, the internal electrode two-piece layer 52B and the internal electrode three-piece layer 53 may be provided alternately with the dielectric layer 4 interposed between.

The internal electrode two-piece layer 52B may include two internal electrodes, i.e., an internal electrode 521B and an internal electrode 522B. In the internal electrode 521B and the internal electrode 522B, both of one end side W0 in the length direction L and the other end side W0 may have curved shapes. One end side W0 of the internal electrode 521B may be spaced a fixed distance from the first external electrode 3A. The other end side W0 of the internal electrode 521B and one end side W0 of the internal electrode 522B may be opposed to each other with an interval provided therebetween. The other end side W0 of the internal electrode 522B may be spaced a fixed distance from the second external electrode 3B. In other words, the internal electrode 521B and the internal electrode 522B may not be connected to the external electrode 3. That is, the internal electrodes 521B and 522B may be referred to as floating electrodes.

The internal electrode three-piece layer 53 may include three internal electrodes, i.e., an internal electrode 531, an internal electrode 532, and an internal electrode 533. In the internal electrode 531, one side in the length direction L may be exposed at the first end surface CA of the multilayer body 2 and connected to the first external electrode 3A. In the internal electrode 531, the other end side W0 in the length direction L may have a curved shape.

In the internal electrode 533, one side in the length direction L may be exposed at the second end surface CB of the multilayer body 2 and connected to the second external electrode 3B. In the internal electrode 533, the other end side W0 in the length direction L may have a curved shape.

The internal electrode 532 may be provided between the internal electrode 531 and the internal electrode 533. In the internal electrode 532, both one end side and the other end side in the length direction L may have curved shapes. One end side W0 of the internal electrode 532 and the end side W0 of the internal electrode 531 may oppose each other with an interval provided therebetween. The other end side W0 of the internal electrode 532 and the end side W0 of the internal electrode 533 may oppose each other with an interval provided therebetween. That is, the internal electrode 532 may be referred to as a floating electrode which is not connected to the external electrode 3.

Also in the fourth embodiment of the present invention, the end side W0 of the internal electrode which is not connected to the external electrode 3 may have a curved shape. Therefore, even when the voltage applied to the external electrode 3 increases, the possibility that dielectric breakdown occurs between the external electrode 3 and the internal electrode 50 is reduced between the lateral sides and the end side W0.

Furthermore, the opposing end sides W0 may each have a curved shape between the internal electrode 521B and the internal electrode 522B, between the internal electrode 531 and the internal electrode 532, and between the internal electrode 532 and the internal electrode 533. Therefore, even when the voltage accumulated in the internal electrode 50 increases, the possibility that dielectric breakdown occurs between the end sides W0 is reduced.

Furthermore, in the case of the structure of the fourth preferred embodiment of the present invention, since the plurality of capacitors are connected in series, the withstand voltage performance is improved.

Fifth Preferred Embodiment

Figure 13:
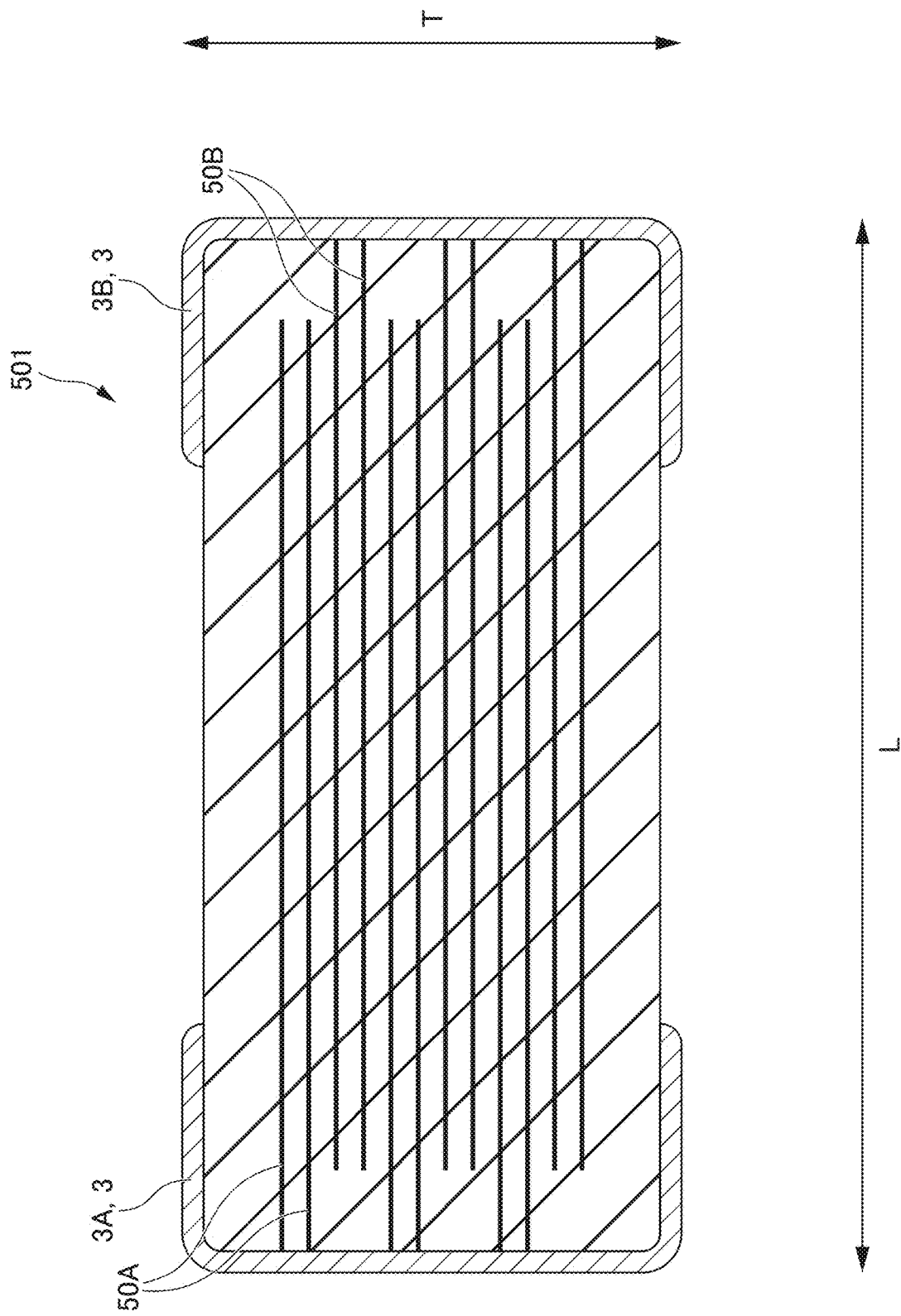
FIG. 13 is a cross-sectional view of a multilayer ceramic capacitor 501 according to a fifth preferred embodiment of the present invention.

FIG. 13 is a cross-sectional view of a multilayer ceramic capacitor 501 according to a fifth preferred embodiment of the present invention. FIG. 13 corresponds to FIG. 2 of the first preferred embodiment. The multilayer ceramic capacitor 501 of the fifth preferred embodiment of the present invention may include a first internal electrode 50A and a second internal electrode 50B having shapes the same as or similar to those of the first preferred embodiment. The multilayer ceramic capacitor 501 of the fifth preferred embodiment of the present invention differs from the multilayer ceramic capacitor 1 of the first preferred embodiment of the present invention in that the first internal electrode 50A and the second internal electrode 50B are provided alternately by two layers.

Also in the fifth preferred embodiment of the present invention, the end sides W0 of the first internal electrode 50A and the second internal electrode 50B which are not connected to the external electrode 3 may each have a curved shape. Therefore, even when the voltage applied to the external electrode 3 increases, the possibility that dielectric breakdown occurs between the first internal electrode 50A and the first external electrode 3A, and between the second internal electrode 50B and the second external electrode 3B is reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including an inner layer portion including internal electrode layers and dielectric layers laminated alternately in a lamination direction, the internal electrode layers each extending in a length direction and a width direction, the dielectric layers each extending in the length direction and the width direction and including about 100 moles or more and about 101 moles or less of Ca with respect to 100 moles of Zr; and two external electrodes respectively on end surfaces of the multilayer body in the length direction; wherein one side in the length direction of each of the internal electrode layers is connected to one of the two external electrodes;

another side in the length direction of each of the internal electrode layers is not connected to either of the two external electrodes;

when a length at a middle portion in the width direction of each of the internal electrode layers is defined as L1, and a length at an end portion in the width direction of each of the internal electrode layers is defined as L2, each of the internal electrode layers includes a curved end side on the another side in the length direction and extends in the width direction so that a relationship of L2<L1 is satisfied; and the dielectric layers each include about 1.3 moles or more and about 4.4 moles or less of Ti with respect to 100 moles of Zr.

2. The multilayer ceramic capacitor according to claim 1, wherein, when a maximum width of each of the internal electrode layers is defined as Wmax, a relationship of Wmax<L2 is satisfied.

3. The multilayer ceramic capacitor according to claim 2, wherein a radius of curvature at the middle portion of each of the internal electrode layers in the width direction of the curved end side is about 70% or more of Wmax.

4. The multilayer ceramic capacitor according to claim 1, wherein, when a maximum width of each of the internal electrode layers is defined as Wmax, relationships of about 0.2Wmax<L2−L1<about 0.4Wmax and Wmax<about 0.6L2 are satisfied.

5. The multilayer ceramic capacitor according to claim 1, wherein a distance between a side surface in the width direction of the multilayer body and an end portion in the width direction of each of the internal electrode layers is about 2.0 μm or more and about 60 μm or less; and a thickness of each of the internal electrode layers is about 1.0 μm or more and about 4.0 μm or less.

6. The multilayer ceramic capacitor according to claim 1, wherein a dimension of the multilayer ceramic capacitor in the length direction is about 0.2 mm or more and about 2.0 mm or less;

a dimension of the multilayer ceramic capacitor in the lamination direction is about 0.1 mm or more and about 1.2 mm or less; and a dimension of the multilayer ceramic capacitor in the width direction is about 0.1 mm or more and about 1.2 mm or less.

7. The multilayer ceramic capacitor according to claim 1, wherein a number of the internal electrode layers is 30 or more and 50 or less.

8. The multilayer ceramic capacitor according to claim 1, wherein, when the inner layer portion is equally or substantially equally divided into three portions in the lamination direction, a number of the internal electrode layers included in a middle portion among the three portions is smaller than a number of the internal electrode layers included in both side portions.

9. The multilayer ceramic capacitor according to claim 1, wherein the internal electrode layers include internal electrode one-piece layers and internal electrode two-piece layers alternately provided;

the internal electrode one-piece layers each include a single internal electrode; and the internal electrode two-piece layers each include two internal electrodes spaced apart from each other.

10. The multilayer ceramic capacitor according to claim 1, wherein the internal electrode layers include internal electrode two-piece layers and internal electrode three-piece layers alternately provided;

the internal electrode two-piece layers each include two internal electrodes spaced apart from each other; and the internal electrode three-piece layers each include three internal electrodes spaced apart from each other.

11. The multilayer ceramic capacitor according to claim 1, wherein the internal electrode layers include:

a first internal electrode layer connected to one of the two external electrodes; and a second internal electrode layer connected to another of the two external electrodes; and the first internal electrode layer and the second internal electrode layer are alternately provided in two layers.

12. The multilayer ceramic capacitor according to claim 1, wherein each of the external electrodes extend to portions of side surfaces and main surfaces of the multilayer body.

13. The multilayer ceramic capacitor according to claim 1, wherein each of the dielectric layers includes $CaZrO_3$.

14. The multilayer ceramic capacitor according to claim 1, wherein the dielectric layers each include about 1.5 moles or more and about 4.0 moles or less of Ti with respect to 100 moles of Zr.

15. The multilayer ceramic capacitor according to claim 1, wherein each of the internal electrode layers includes Cu or Cu alloy.

* * * * *